United States Patent [19]

Alasia

[11] Patent Number: 4,914,700
[45] Date of Patent: Apr. 3, 1990

[54] METHOD AND APPARATUS FOR SCRAMBLING AND UNSCRAMBLING BAR CODE SYMBOLS

[76] Inventor: Alfred V. Alasia, 146-07 Thirteenth Ave., Whitestone, N.Y. 11357

[21] Appl. No.: 254,388

[22] Filed: Oct. 6, 1988

[51] Int. Cl.⁴ .................... G09C 5/00; G02B 27/00; G03B 27/68; G06K 7/10
[52] U.S. Cl. ........................... 380/54; 350/167; 355/52; 250/568; 235/454; 235/462; 235/470
[58] Field of Search ................. 380/54; 235/435, 454, 235/462, 470; 250/568; 350/167; 354/115; 355/52

[56] References Cited

U.S. PATENT DOCUMENTS

| | | | |
|---|---|---|---|
| 3,781,109 | 12/1973 | Mayer, Jr. et al. | 355/52 |
| 4,023,902 | 5/1977 | Ungerman | 355/52 |
| 4,202,626 | 5/1980 | Mayer, Jr. et al. | 250/222.1 X |
| 4,420,221 | 12/1983 | Sparks | 350/167 |

*Primary Examiner*—Thomas H. Tarcza
*Assistant Examiner*—Linda J. Wallace
*Attorney, Agent, or Firm*—Schiller, Pandiscio & Kusmer

[57] ABSTRACT

Apparatus for and method of unscrambling a parallax panoramagram that is a lineticular dissection of a bar code formed by scrambling the bar code in accordance with a graticule formed of a plurality of parallel contiguous focussing elements disposed at a spatial frequency greater than the modular spatial frequency of the bar code. The method includes positioning said panoramagram contiguous to the opposite surface of a light transparent screen having a plurality of elongated parallel line elements including focussing surfaces disposed in common along a first surface of the screen, the spatial frequency of those line elements being matched to the spatial frequency of the focussing elements. Positioning is achieved so that the line elements are disposed substantially parallel to the lines in the lineticular dissection.

A beam of light is used to scan the panoramagram by moving the beam across said first surface of the screen transversely to the axes of the line elements, the beam having a cross-section dimension, where incident on the screen, not greater than the width of the line element. Light reflected from the scan of the beam across a registered panoramagram and screen, is converted into electrical signals representing an unscrambled version of the bar code.

26 Claims, 1 Drawing Sheet

Fig. 1
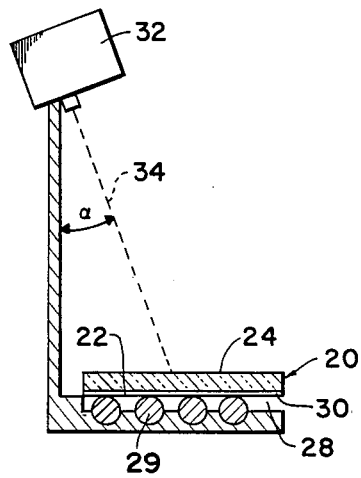
Fig. 3
Fig. 2
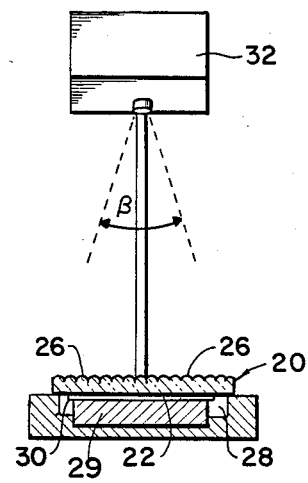
Fig. 4

METHOD AND APPARATUS FOR SCRAMBLING AND UNSCRAMBLING BAR CODE SYMBOLS

The present invention relates to systems for scrambling and unscrambling bar codes, and more particularly to apparatus for and method of minimizing the counterfeiting of and for verifying the authenticity of a bar code.

When there is a need to track, identify and enter information about persons, places and things into computer-based systems, bar coding currently provides one of the most accurate, efficient and cost-effective systems compared with other data entry systems. Bar coding is generally regarded as the industry standard for automated data collection; other machine-reading techniques, such as optical character recognition, magnetic stripes and punch cards have now fallen behind in general usage for a number of reasons. For example, magnetic stripes are relatively expensively printed or applied by hot stamping, but cannot be read at a distance, and often are subject to easy alteration of the recorded data, hence are at a distinct disadvantage where data security is important. Optical character recognition is not as accurate, flexible and reliable as bar code symbol scanning because it usually contains no vertical redundancy or internal checking. Punch card entry is too slow for current computer speeds and exhibits an operator keyboard entry error ratio of about 1:300, whereas the much faster optical character recognition provides an error ratio of about 1:10,000, and reading bar codes symbols has an error ratio of about 1:3,000,000.

A bar code symbol, for purposes of the present exposition, can be defined as a graphically reproduced array of elements formed as various width, parallel, rectangular bars, and the spaces between such bars, representing one or more characters in a numerical or alphanumerical set. The symbol is generally printed in a single color on an optically color-contrasting background, and by convention, the bars in the set are considered to be the darker of the contrasting elements. The number of elements in each character can range widely, e.g. typically from 7 to 16 depending upon the particular bar code selected. A bar code symbol generally contains a leading quiet zone, a start character, one or more data characters including often a check character, a stop character and a trailing quiet zone. The term "module", as applied to bar code symbols, is understood to refer to the narrowest nominal bar or space in the code, wider bars and spaces usually being specified as multiples of a module. The spatial frequency of the modules is thus defined in terms of the number of modules per unit distance (e.g. an inch) in the printed symbol.

Bar codes are generally read by optically scanning a light beam transversely across all of the elements of the symbol. The term "light" as used herein is to be interpreted as including a wider band of radiation than the visible spectrum, and is deemed to include ultra violet and infra-red radiation as well. The reflections of the scanning light from the symbol or emissions excited by the scanning light are converted to electrical signals. Because the information in the symbol is carried by the relative widths of the bars and spaces in each character, the electrical signals are then usually decoded by an electronic computer or decoder to recover that information, typically in a form comprehensible usually to the computer.

A large number of such bar codes has been developed since their original introduction sometime during the 1960s. Current examples of such developments are the well-known and widely used Two of Five Code, UPC and Codabar, all of which have 12 or less principal characters and are thus primarily numerical codes, Code 39 that is an alphanumeric bar code including 44 characters, and many others.

Usually, the smallest average module in a bar code symbol ranges in width between 0.0065 and 0.0104 inches. Bar codes symbols with modules of these substantial dimensions can thus be successfully printed by almost any printing process in general usage, hence have previously been readily duplicated even xerographically or counterfeited by other printing processes. Because bar code symbols have now found widespread usage to provide machine-readable indicia on tags and labels attached to merchandise such as groceries, clothing and the like, and printed on machine-read documents such as transit passes and the like, counterfeiting of the bar code symbol has become a serious problem. Counterfeiting of documents costs the American public billions of dollars annually, and is responsible for the loss of hundreds of thousands of jobs. Worldwide trade suffers seriously from well-organized and extensive counterfeiting piracy of products such as watches, luggage, clothing and the like, financial instruments such as certificates of deposit, lottery tickets, tax stamps, bank checks, stock certificates and the like, and other important documents such as identification cards, passports and the like.

U.S. Pat. Nos. 3,937,565; 3,769,890; 4,092,654; and 4,198,147 disclose anticounterfeiting systems that involve forming a parallax panoramagram image, typically photographically through a lenticular line screen (i.e. a lineticular screen), usually having a spatial line frequency of 69/inch. The resulting image is a scrambled lineticular dissection of a subject, which image is difficult or even impossible to read visually and resists ready reproduction by photographic or xerographic techniques, the extent of scrambling provided by this system being controlled by a large variety of parameters peculiarly under the control of the originator of the scrambled image. The scrambled image can be unscrambled to be examined as by visual reading, by a simple decoder that in effect is a duplicate of the lenticular screen used to form the original image. Such scrambled images have found widespread usage in security printing of bank notes, stock certificates, bonds, travelers checks, lottery tickets, passports, airline tickets, gift certificates, bank checks, postal money orders and similar instruments, all with a remarkable record of substantially no losses or fraud due to counterfeiting.

The scrambling process of the aforementioned patents with the standard lenticular line screen of 69 lines/inch does not, however, offer substantial anticounterfeiting protection to standard bar code symbols because the latter, being an array of a series of parallel bars that necessarily are highly contrasted with their background, when scrambled in this manner do not readily resist either photographic or xerographic duplication.

A principal object of the present invention is therefore to provide apparatus for and method of unscrambling a scrambled parallax panoramagram of a bar code symbol, which panoramagram is highly resistant to unauthorized duplication.

To effect the foregoing and other objects of the present invention, a parallax panoramagram that is a lineticular dissection of a bar code symbol is formed by scrambling the bar code in accordance with a graticule formed of a plurality of parallel contiguous focussing elements, all as taught in the foregoing U.S. Pat. Nos. 3,937,565; 3,769,890; 4,092,654; and 4,198,147, but here at a spatial frequency at or greater than the modular frequency of the bar code, preferably at least about 155 elements per inch for those current bar code symbols that have the narrowest modules. Panoramagrams thus produced are decoded by placing them in contiguous relation to a first surface of a light transparent screen having a plurality of elongated parallel line elements including focussing surfaces disposed in common along the opposite or second surface of the screen, the screen and panoramagram being relatively positioned so that the line elements of the screen are substantially parallel to the lines in the lineticular dissection. The spatial frequency of the line elements of the screen is necessarily matched to the spatial frequency of the focussing elements of the graticule.

The panoramagram is examined through the screen preferably by scanning the panoramagram typically with a laser beam swept across the second surface of the screen transversely to the axes of the screen's line elements, the beam having a cross-section dimension, where incident on the screen, not greater than the width of one of the line elements. Preferably, during scanning, the beam is directed toward the screen in a direction substantially parallel to the axes of the line elements of the screen and at a non-perpendicular angle below the critical angle to the mean plane of said screen, e.g. at about 20 degrees from a perpendicular to the plane of the screen. Light reflected from or excited by the scan of said beam across the panoramagram is then converted into electrical signals and represents an unscrambled version of the original bar code symbol.

Other objects of the present invention will in part appear obvious and will in part appear hereinafter. The invention accordingly comprises the apparatus possessing the construction, combination of elements and arrangement of parts, and the method comprising the several steps, and the relation of one or more of such steps with respect to each of the others, all of which are exemplified in the following detailed disclosure and the scope of the application of which will be indicated in the claims.

For a fuller understanding of the nature and objects of the present invention, reference should be had to the following detailed description taken in connection with the accompanying drawing wherein:

FIG. 1 is an example of a typical original or unscrambled bar code symbol (Two of Five);

FIG. 2 is a representation of a scrambled image of the bar code symbol of FIG. 1 provided by the method of the present invention;

FIG. 3 is a side view, partly in cross-section of a simplified embodiment of a system for unscrambling a scrambled image of a bar code symbol provided by the method of the present invention; and FIG. 4 is a front view, partly in cross-section of the system of FIG. 3.

As noted earlier herein, a scrambled image (FIG. 2) of a bar code symbol (FIG. 1) is preferably produced by any of the techniques described in the aforesaid U.S. Pat. Nos. 3,937,565; 3,769,890; 4,092,654; and 4,198,147, and need not be further described herein except as follows: When bar code symbols are imaged in such prior art scrambling systems using a graticule that is a lineticular screen having a spatial line frequency (e.g. 69 lines/inch, the current standard) smaller than the nominal spatial modular frequency of the bar code symbol, scrambling or encoding is very poorly achieved, if at all. The resulting image can be readily read visually and can be easily duplicated xerographically, thereby providing little or no security against unauthorized copying. It has now been found that a well-scrambled, machine readable panoramagram, highly resistant to being copied or duplicated as by xerographic reproduction, is provided when the graticule used to effect the scrambling process is formed with a line frequency greater than the spatial modular frequency of the bar code symbol and the scrambling process is carried out with the lines or contiguous, focussing elements of the graticule substantially parallel to the modules of the bar code symbol. Preferably, because current bar code modules have widths generally above 0.0065 inches in width (and thereby exhibit a spatial frequency of less than about 155 line/inch) it is preferred to use a graticule of at least that frequency, but preferably greater (e.g. 177 elements/inch), to scramble and unscramble the resulting panoramagram. It will, however, be appreciated that the number of contiguous focussing elements per inch in the scrambling graticule and unscrambling screen can be at any other frequency dependent upon the nominal modular width of the bar code to be used and the physical restraints imposed by the requirement of manufacturing the graticule and printing the bar code symbols from the resulting image. It has also been found that optimum scrambling will occur when the modules of the bar code symbol being scrambled are positioned, during the scrambling process, substantially parallel with the focussing elements of the graticule.

The present invention particularly involves unscrambling the parallax panoramagram of the bar code symbol, and to that end, as shown in FIGS. 3 and 4 (wherein like numerals denote like parts) the invention comprises light transparent screen 20 having a typically flat or planar bottom surface 22 and upper surface 24 characterized in having disposed in common thereon a plurality of line elements 26 defined by elongated, parallel focussing surfaces. In a preferred embodiment, both the graticule used to scramble the bar code symbol and screen 20 are substantially identical lineticular screens in which line elements 26 are hemicylindrical, anamorphic lenses, the radius of curvature of each of the hemicylindrical lens surfaces being about 0.3 inches, and the thickness of screen 20 between lower surface 22 and the common plane tangent to all of the lenses forming line elements 26, being about 0.105 inches.

Because the line frequency of screen 20 is identical to that of the graticule used to scramble the bar code symbol to be unscrambled, and as noted the line frequency of that graticule depends heavily upon the modular frequency of the symbols of the bar code of interest, typically where the smallest width of a module of that bar code is not less than about 0.006 inches, the spatial frequency of said screen should be at least about 155 line elements per inch, and preferably is a larger value, for example 177 line elements per inch.

It will be appreciated that the unscrambling process requires that the panoramagram to be unscrambled be disposed contiguous to surface 22, so that the scrambled image is in the same relation to the focussing surfaces of line screen 20 as they were to the graticule. Similarly, it is important that line elements 26 and the lines in the lineticular dissection to be unscrambled be positioned substantially parallel to one another. To these ends, the embodiment of FIGS. 3 and 4 includes decoding chamber 28 positioned immediately below surface 22 and into which can be inserted, with proper orientation, a sheet bearing a parallax panoramagram of the type to be unscrambled, so that such panoramagram can be examined through the screen. Means such as rollers 29 or the like, are shown for holding panoramagram 30 at least in contiguous relation with surface 22.

In the present invention, unscrambling is achieved by examining the scrambled bar code symbols in panoramagram 30 disposed in chamber 28. For example, ordinarily the panoramagram will be rendered as a positive photographic silver image or printed in ordinary ink on a highly contrasting background, and the scrambled image can be examined by reflection of light therefrom. Alternatively, the panoramagram can be printed in an ink substantially invisible under ordinary illumination by visible radiation, which ink, however, can be rendered visible by absorption of, for example, ultraviolet radiation. In the latter instance, of course, screen 20 is necessarily formed of a material transparent and refractive to such excitation radiation. Where it is desirable to read the panoramagram by machine, as in the present case, it is preferable not to depend upon ambient illumination, but to provide a source of light that is more dependable and that can be, if desired, carefully matched to a detector.

To those ends, the present invention thus includes means, such as scanning source and detector 32, for producing a beam of light and for directing it through screen 20 wherein it either reflects from panoramagram 30 or excites emissions from the panoramagram. Source 32 is typically a commercially available laser or solid state scanner such as the Laserscan 6500 sold by Symbol Technologies Inc. of Bohemia, N.Y. or described in U.S. Pat. Nos. 4,387,297 and 4,409,470. Where source 32 includes a laser, typically the latter generate typically red light with a center frequency of about 633 nanometers, that conveniently can have a very small cross-section dimension. Alternatively, source 32 can produce a beam of ultraviolet radiation (typically at wavelengths of 254 or 367 nanometers) for use where the panoramagram is rendered, as by printing, in "invisible" ink that will fluoresce when excited by ultraviolet radiation. In any case, source 32 functions to scan panoramagram 30 by generating beam 34 and moving the beam across surface 24 of screen 20 transversely to the parallel axes of elongation of line elements 26 at least through an angle B subtending the full width of panoramagram 30. Importantly, it has been found that beam 34 will not properly unscramble the panoramagram unless the cross-section dimension of the beam, where incident on surface 24, is not greater than the width of line element or hemicylindrical lens 26.

Where typically screen 20 is a substantially planar screen, source 32 should be so positioned with respect to screen 20 that beam 34 is directed toward the screen substantially parallel to the axes of elongation of elements 26 and at a non-perpendicular angle $\beta$ below the critical angle to the mean plane of the screen. The angle of incidence of beam 34 on screen 20 is fairly critical in that substantial deviation from a preferred angle will result in inferior performance or in no unscrambling at all. Thus, for the Laserscan 6500 scanner, angle $\alpha$ preferably is about 20 degrees from a perpendicular to the plane of screen 20.

As is well known in the art, commercially available scanners such as described detect light reflected from or excited by the scan of beam 34, and convert the now unscrambled bar code symbol represented by the detected light into electrical signals. Those electrical signals can then be transmitted to a decoding system, such as a digital computer and decoded in a manner known to those skilled in the bar code art, to represent the number or alphabetical indicia represented by the bar code symbol.

Since certain changes and modifications can be made in the above-described apparatus and method without departing from scope of the invention herein involved, it is intended that all matter contained in the above description and shown in the accompanying drawing shall be interpreted in an illustrative and not in a limiting sense.

What is claimed is:

1. Method of coding and decoding a bar code, said method comprising the steps of:
    forming a parallax panoramagram that is a lineticular dissection of said bar code, by scrambling said bar code in accordance with a graticule formed of a plurality of parallel contiguous focussing elements at a spatial frequency greater than the modular spatial frequency of said bar code;
    providing a light transparent screen having a plurality of elongated parallel line elements including focussing surfaces disposed in common along a first surface of said screen, the spatial frequency of said line elements being matched to the spatial frequency of said focussing elements of said graticule;
    positioning said panoramagram contiguous to the opposite surface of said screen with said line elements disposed substantially parallel to the lines in said lineticular dissection; and
    examining said panoramagram through said screen.

2. Method as defined in claim 1 wherein said step of examining comprises:
    producing a beam of light;
    scanning said panoramagram by moving said beam across said first surface of said screen transversely to the line axes of said line elements, said beam being produced with a cross-section dimension, where incident on said screen, not greater than the width of a line element: and
    detecting light reflected from the scan of said beam across a registered panoramagram and screen, and converting said reflected light into electrical signals representing an unscrambled version of said bar code.

3. Method as defined in claim 1 including the step of positioning the modules of said bar code substantially parallel to said focussing elements of said graticule when forming said panoramagram.

4. Method as defined in claim 1 wherein both said graticule and said screen have the same predetermined thickness and predetermined curvature of said focussing elements and focussing surfaces.

5. Method as defined in claim 1 wherein said graticule has at least about 155 elongated focussing elements to the inch.

6. Method of unscrambling a parallax. panoramagram that is a lineticular dissection of a bar code formed by scrambling said bar code in accordance with a graticule formed of a plurality of parallel contiguous focussing elements disposed at a spatial frequency greater than the modular spatial frequency of said bar code, said method comprising the steps of:

provding a light transparent screen having a plurality of elongated parallel line elements including focussing surfaces disposed in common along a first surface of said screen, the spatial frequency of said line elements being matched to the spatial frequency of said focussing elements;

positioning said panoramagram contiguous to the opposite surface of said screen with said line elements disposed substantially parallel to the lines in said lineticular dissection;

producing a beam of light;

scanning said panoramagram by moving said beam across said first surface of said screen transversely to the line axes of said line elements, said beam being produced with a cross-section dimension, where incident on said screen, not greater than the width of a line element; and detecting light reflected from the scan of said beam across a registered panoramagram and screen, and converting said reflected light into electrical signals representing an unscrambled version of said bar code.

7. Method as defined in claim 6 wherein said screen is provided as a substantially planar screen and wherein said beam during scanning is directed toward said screen substantially parallel to said axes and at a non-perpendicular angle below the critical angle to the mean plane of said screen.

8. Method as defined in claim 6 wherein said screen is substantially planar, and said beam during scanning is directed toward said screen substantially parallel to said axes and at about 20 degrees from the perpendicular.

9. Method as defined in claim 6 wherein said light is produced as a substantially coherent monochromatic beam.

10. Method as defined in claim 9 wherein said light is produced as red light at a center wavelength of about 633 nanometers.

11. Method as defined in claim 6 wherein said panoramagram is formed in a material that will fluoresce when excited by ultraviolet radiation, and wherein said light is produced as ultraviolet light.

12. Apparatus for unscrambling a scrambled parallax panoramagram that is a lineticular dissection of a bar code, which panoramagram is formed by scrambling said bar code in accordance with a graticule having a plurality of parallel, contiguous, focussing elements disposed at a spatial frequency greater than the modular spatial frequency of said bar code, said apparatus comprising, in combination:

a light transparent screen having a plurality of elongated parallel line elements having focussing surfaces disposed in common along one surface of said screen, the spatial frequency of said line elements being matched to the spatial frequency of said focussing elements;

optical scanning means for producing a beam of light and being disposed with respect to said screen for scanning said beam across said first surface of said screen transversely to the line axes of said line elements, said beam, where incident on said screen, having a cross-section dimension not greater than the width of a line element;

means for positioning said panoramagram contiguous to the opposite surface of said screen with said line elements disposed substantially parallel to the lines in said lineticular dissection; and means for detecting light reflected from the scan of said beam across a registered panoramagram and screen, and for converting said reflected light into electrical signals representing an unscrambled version of said bar code.

13. Apparatus as defined in claim 12 wherein said screen is a lineticular screen, and said line elements are hemicylindrical lenses.

14. Apparatus as defined in claim 13 wherein the radius of curvature of each of the hemicylindrical lens surfaces is about 0.3 inches.

15. Apparatus as defined in claim 13 wherein the thickness of said screen is about 0.105 inches.

16. Apparatus as defined in claim 12 wherein the smallest width of a module of said bar code is not less than about 0.006 inches, and the spatial frequency of said screen is at least about 155 line elements per inch.

17. Apparatus as defined in claim 12 wherein the smallest width of a module of said bar code is not less than about 0.006 inches, and the spatial frequency of said screen is about 177 line elements per inch.

18. Apparatus as defined in claim 12 wherein said graticule has a predetermined thickness and a predetermined curvature of surfaces of said lens elements, and said line elements in said screen have the same thickness and radius of curvature as the focussing elements in said graticule.

19. Apparatus as defined in claim 12 wherein said screen has the same configuration as said graticule.

20. Apparatus as defined in claim 19 wherein said screen is substantially planar.

21. Apparatus as defined in claim 12 wherein said optical scanning means includes a laser.

22. Apparatus as defined in claim 21 wherein said laser generates red light at a center wavelength of about 633 nanometers.

23. Apparatus as defined in claim 12 wherein said optical scanning means comprises a solid state light source.

24. Apparatus as defined in claim 23 wherein said optical scanning means comprises a source of ultraviolet light.

25. Apparatus as defined in claim 12 wherein said screen is substantially planar, and said beam is directed toward said screen at a non-perpendicular angle below the critical angle to the mean plane of said first surface.

26. Apparatus as defined in claim 12 wherein said screen is substantially planar, and said beam is directed toward said screen parallel to said line elements and at about 20 degrees from the perpendicular.

* * * * *